US007689656B2

United States Patent
McCarthy et al.

(10) Patent No.: US 7,689,656 B2
(45) Date of Patent: *Mar. 30, 2010

(54) COMMUNICATIONS SYSTEM PROVIDING MESSAGE AGGREGATION FEATURES AND RELATED METHODS

(75) Inventors: Steven J. McCarthy, Bellevue, WA (US); Darren L. Gardner, Issaquah, WA (US); Michael Jack Zakharoff, Sumner, WA (US)

(73) Assignee: Teamon Systems, Inc., Issaquah, WA (US)

(*) Notice: Subject to any disclaimer, the term of this patent is extended or adjusted under 35 U.S.C. 154(b) by 210 days.

This patent is subject to a terminal disclaimer.

(21) Appl. No.: 11/459,227

(22) Filed: Jul. 21, 2006

(65) Prior Publication Data
US 2007/0203994 A1 Aug. 30, 2007

Related U.S. Application Data

(63) Continuation of application No. 10/779,350, filed on Feb. 13, 2004, now Pat. No. 7,111,047.

(60) Provisional application No. 60/493,763, filed on Aug. 8, 2003.

(51) Int. Cl.
*G06F 15/16* (2006.01)

(52) U.S. Cl. .................. 709/206; 709/207; 709/217; 709/219; 709/227; 709/230; 709/249; 370/450

(58) Field of Classification Search .......... 709/206, 709/207, 217, 219, 230, 249
See application file for complete search history.

(56) References Cited

U.S. PATENT DOCUMENTS

| 5,802,292 A | 9/1998 | Mogul | 395/200.33 |
| 5,805,298 A | 9/1998 | Ho et al. | 358/402 |
| 5,822,523 A | 10/1998 | Rothschild et al. | 709/236 |
| 5,937,162 A | 8/1999 | Funk et al. | 709/206 |
| 5,995,503 A | 11/1999 | Crawley et al. | 370/351 |

(Continued)

FOREIGN PATENT DOCUMENTS

EP 0491367 6/1992

(Continued)

OTHER PUBLICATIONS

"Fetchmail", http://fetchmail.berlios.de/, Jul. 2, 2009.

(Continued)

*Primary Examiner*—Hassan Phillips
*Assistant Examiner*—Saket K Daftuar
(74) *Attorney, Agent, or Firm*—Allen, Dyer, Doppelt, Milbrath & Gilchrist, P.A.

(57) ABSTRACT

A communications system may include a plurality of source message servers for storing messages for delivery to a user, a target message server having a target message box associated therewith, and an aggregation server for periodically aggregating the messages from the source message servers to the target message box for retrieval by the user. The target message server may provide a delivery failure message to the aggregation server based upon a failure to deliver a message to the target message box. As such, the aggregation server may increase a period of sending messages to the target message box based upon a delivery failure message therefrom, and thereafter decrease the period of sending messages to the target message box based upon a successful delivery of a message thereto.

13 Claims, 3 Drawing Sheets

U.S. PATENT DOCUMENTS

| | | | |
|---|---|---|---|
| 6,070,191 A | 5/2000 | Narendran et al. | 709/226 |
| 6,175,858 B1 | 1/2001 | Bulfer et al. | 709/206 |
| 6,185,603 B1 * | 2/2001 | Henderson et al. | 709/206 |
| 6,389,455 B1 | 5/2002 | Fuisz | 709/206 |
| 6,421,732 B1 | 7/2002 | Alkhatib et al. | 709/245 |
| 6,438,583 B1 | 8/2002 | McDowell et al. | 709/206 |
| 6,446,114 B1 | 9/2002 | Bulfer et al. | 709/206 |
| 6,549,937 B1 | 4/2003 | Auerbach et al. | 709/206 |
| 6,557,026 B1 | 4/2003 | Stephens, Jr. | 709/203 |
| 6,560,222 B1 | 5/2003 | Pounds et al. | 370/353 |
| 6,615,212 B1 | 9/2003 | Dutta et al. | 707/10 |
| 6,643,688 B1 | 11/2003 | Fuisz | 706/206 |
| 6,654,787 B1 * | 11/2003 | Aronson et al. | 709/206 |
| 6,744,780 B1 | 6/2004 | Gu et al. | 370/450 |
| 6,842,773 B1 | 1/2005 | Ralston et al. | 709/206 |
| 6,854,007 B1 | 2/2005 | Hammond | 709/206 |
| 6,931,433 B1 | 8/2005 | Ralston et al. | 709/206 |
| 6,957,248 B2 | 10/2005 | Quine et al. | 709/206 |
| 6,959,324 B1 | 10/2005 | Kubik et al. | 709/206 |
| 7,010,572 B1 | 3/2006 | Benjamin et al. | 709/206 |
| 7,200,636 B2 * | 4/2007 | Harding | 709/206 |
| 2002/0026484 A1 | 2/2002 | Smith | 709/206 |
| 2002/0042815 A1 * | 4/2002 | Salzfass et al. | 709/206 |
| 2002/0112007 A1 | 8/2002 | Wood et al. | 709/206 |
| 2002/0120690 A1 | 8/2002 | Block | 709/206 |
| 2002/0174194 A1 | 11/2002 | Mooney et al. | 709/219 |
| 2003/0134621 A1 | 7/2003 | Yabe et al. | 455/413 |
| 2003/0135573 A1 * | 7/2003 | Taylor | 709/207 |
| 2004/0088357 A1 * | 5/2004 | Harding | 709/206 |
| 2004/0221011 A1 | 11/2004 | Smith et al. | 709/206 |
| 2005/0010644 A1 * | 1/2005 | Brown et al. | 709/206 |
| 2005/0020250 A1 * | 1/2005 | Chaddha et al. | 455/414.1 |
| 2005/0039048 A1 * | 2/2005 | Tosey | 713/201 |
| 2005/0055404 A1 * | 3/2005 | Kitchen, Jr. | 709/206 |
| 2006/0075031 A1 * | 4/2006 | Wagner et al. | 709/206 |
| 2006/0123085 A1 * | 6/2006 | Burns et al. | 709/206 |
| 2006/0161626 A1 * | 7/2006 | Cardina et al. | 709/206 |
| 2007/0041327 A1 * | 2/2007 | Foster et al. | 370/242 |
| 2008/0065730 A1 * | 3/2008 | Wilson | 709/206 |

OTHER PUBLICATIONS

"eMail Bounce Handler", Programming, LLC, 2001-2008, http://www.maxprop.com/EmailBounceHandler.html, MAX Programming, LLC, 2001-2008, downloaded Jul. 16, 2009.

* cited by examiner

COMMUNICATIONS SYSTEM PROVIDING MESSAGE AGGREGATION FEATURES AND RELATED METHODS

CROSS-REFERENCE TO RELATED APPLICATIONS

This application is a continuation of Ser. No. 10/779,350 filed Feb. 13, 2004 now U.S. Pat. No. 7,111,047 which claims the benefit of U.S. Provisional Application No. 60/493,763, filed Aug. 8, 2003, both of which are hereby incorporated herein in their entireties by reference.

FIELD OF THE INVENTION

The present invention relates to the field of communications systems, and, more particularly, to electronic messaging systems and related methods.

BACKGROUND OF THE INVENTION

Electronic mailboxes are used to store electronic mail (e-mail) messages. Electronic mailboxes are connected to the Internet and use Internet protocols to send and receive incoming and outgoing e-mail messages. A user uses a mail program to compose and send messages. The sender's mail program communicates with the sender's mail server and delivers the message across the Internet to the recipient's mail server, where the message is deposited into the recipient's mailbox (or target mailbox) as a new incoming e-mail.

An e-mail system is an asynchronous send-and-forget messaging system. That is, e-mail is sent without any knowledge of whether it can successfully be delivered. If an e-mail message cannot be delivered, a new e-mail message, known as a delivery failure report or a bounce message, is generated by the target mail server and sent back to the originating mail server. The bounce message is deposited in the sender's mailbox, notifying the sender that delivery of the original message has failed.

The above single source and target e-mail server scenario works adequately if a user only has only one mailbox. However, most users today have more than one mailbox. A user might have one corporate e-mail account, one Internet service provider (ISP) e-mail account, and two or more free Web e-mail accounts (e.g., a Yahoo or Hotmail e-mail account). As a result, it may be difficult to keep up with and manage all of these different mailboxes.

One approach for providing better e-mail management with multiple mailboxes or accounts is to use an aggregated e-mail delivery system including an e-mail aggregation server. An e-mail aggregation server connects to multiple source mailboxes and consolidates the messages in one target mailbox. That is, these servers log on to existing mailboxes on behalf of the user, using credentials set up by the user, retrieve the messages from the mailboxes, and forward the messages to the target mailbox.

The target mailbox may be stored on the aggregation server, or it may be another e-mail account (i.e., the aggregation server acts as a e-mail forwarding agent). For example, for a user with ten e-mail accounts, it may be difficult for the user to check all these mailboxes regularly. Yet, an aggregation server may be used to pull down or aggregate messages from all ten accounts into one target mailbox.

Message delivery using aggregated e-mail servers simplifies the complexity of multiple mailbox management and message delivery. However, there is one significant drawback. Aggregation servers typically do not address the problem of bounce messages. An e-mail delivery failure at a target mailbox generates a bounce message that results in three undesirable effects. First, the target server sending the bounce message attempts to address the original sender who sent the e-mail to the source mailbox. Since the aggregation server acts as an intermediary and forwards the message from the source mailbox to the target mailbox, the target server cannot know that the bounce message should not be sent to the original sender of the message from the source mailbox. The original sender is typically a third party with no interest in the aggregation, who is likely to be baffled by bounce messages originating from the target server; the original sender only knows about messages sent to the source mailbox server. Thus, bounce messages are not sent to the aggregation server (the intended destination of the bounce message), but instead to the original sender of the message.

Second, if a target mailbox is unable to accept delivery of new messages, there is no way to temporarily slow down or disable deliveries of messages until the target mailbox is once again able to accept mail. This means that bounce messages will continually be sent to the original sender of the message, potentially resulting in an endless message loop. Finally, the original message that triggered the bounce message is never delivered to the intended recipient.

One prior art approach for dealing with bounce messages has been implemented in a software program called eMail Bounce Handler from MaxProg. This program provides a bounce e-mail filtering and handling tool that recognizes bounce e-mails using a customizable set of rules and extracts the recipients addresses, allowing a user to use them again to try sending his mail or to take them off his list. eMail Bounce Handler connects to a post office protocol (POP) mailbox to retrieve bounces, and leaves any other messages untouched. Once the mailbox is processed and all bounces are removed, the program provides a list of "bad" e-mails addresses. The user may then export the list to clean his original address list, or to try to send the e-mail again.

Despite such e-mail bounce message handling approaches, further advancements in dealing with bounce e-mails may be desirable in certain applications.

SUMMARY OF THE INVENTION

In view of the foregoing background, it is therefore an object of the present invention to provide a communications system providing message aggregation and enhanced message delivery failure processing and related methods.

This and other objects, features, and advantages in accordance with the present invention are provided by a communications system which may include a plurality of source message servers for storing messages for delivery to a user, and a target message server having a target message box associated therewith. The system may also include an aggregation server for periodically aggregating the messages from the source message servers to the target message box for retrieval by the user. The target message server may provide a delivery failure message to the aggregation server based upon a failure to deliver a message to the target message box. As such, the aggregation server may increase a period of sending messages to the target message box based upon a delivery failure message therefrom, and thereafter decrease the period of sending messages to the target message box based upon a successful delivery of a message thereto.

More particularly, the aggregation server may selectively re-send messages for which delivery failure messages are received. Additionally, the aggregation server may include an intelligent checker module for sending the messages to the target message server. Moreover, the aggregation server may further include a software agent module having a unique address associated therewith. The intelligent checker module may send the unique address with the messages to the target message server, and the target message box may send the delivery failure messages to the unique address. As such, the software agent module may associate the delivery failure messages with the respective target message box.

The aggregation server may further include a knowledge base module for cooperating with the software agent module for storing delivery failure information for the target message box. Further, the intelligent checker module may cooperate with the knowledge base module to increase or decrease the period of sending based thereon. Moreover, the knowledge base module may cooperate with the software agent module to store the delivery failure information for the target message box based upon a source message box identifier and a message identifier associated therewith.

The communications system may further include a communications device associated with the user for generating retrieving the messages from the target message box. By way of example, the messages may be electronic mail (e-mail) messages, and the communications device may be a mobile wireless communications device, for example.

A message aggregation method aspect of the invention may include periodically aggregating messages stored on a plurality of source message servers to a target message box for retrieval by a user. The method may further include generating delivery failure information based upon a failure to deliver a message to the target message box, and increasing a period of sending messages from the aggregation server to the target message box based upon the generation of delivery failure information therefor, and thereafter decreasing the period of sending messages to the target message box based upon a successful delivery of a message thereto.

An aggregation server in accordance with the present invention may include an aggregation module for aggregating messages stored on a plurality of source message servers to a target message box associated with a target server for retrieval by a user. The target message server may provide a delivery failure message to the aggregation module based upon a failure to deliver a message. Moreover, the aggregation server may further include a knowledge base module for cooperating with the aggregation module to store delivery failure information for the message box. The aggregation module may increase a period of sending messages to the target message box based upon a delivery failure message therefrom, and thereafter decrease the period of sending messages to the target message box based upon a successful delivery of a message thereto.

A computer-readable medium in accordance with the present invention may also include an aggregation module and a knowledge base module, such as those described briefly above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally speaking, the present invention addresses the undesirable effects of bounce or delivery-failure messages by utilizing software modules, for example, to address the traditional shortcomings of aggregation servers. The bounce messages can be resolved by a message throttling mechanism performed by the aggregated server, which will be described further below.

Figure 1:
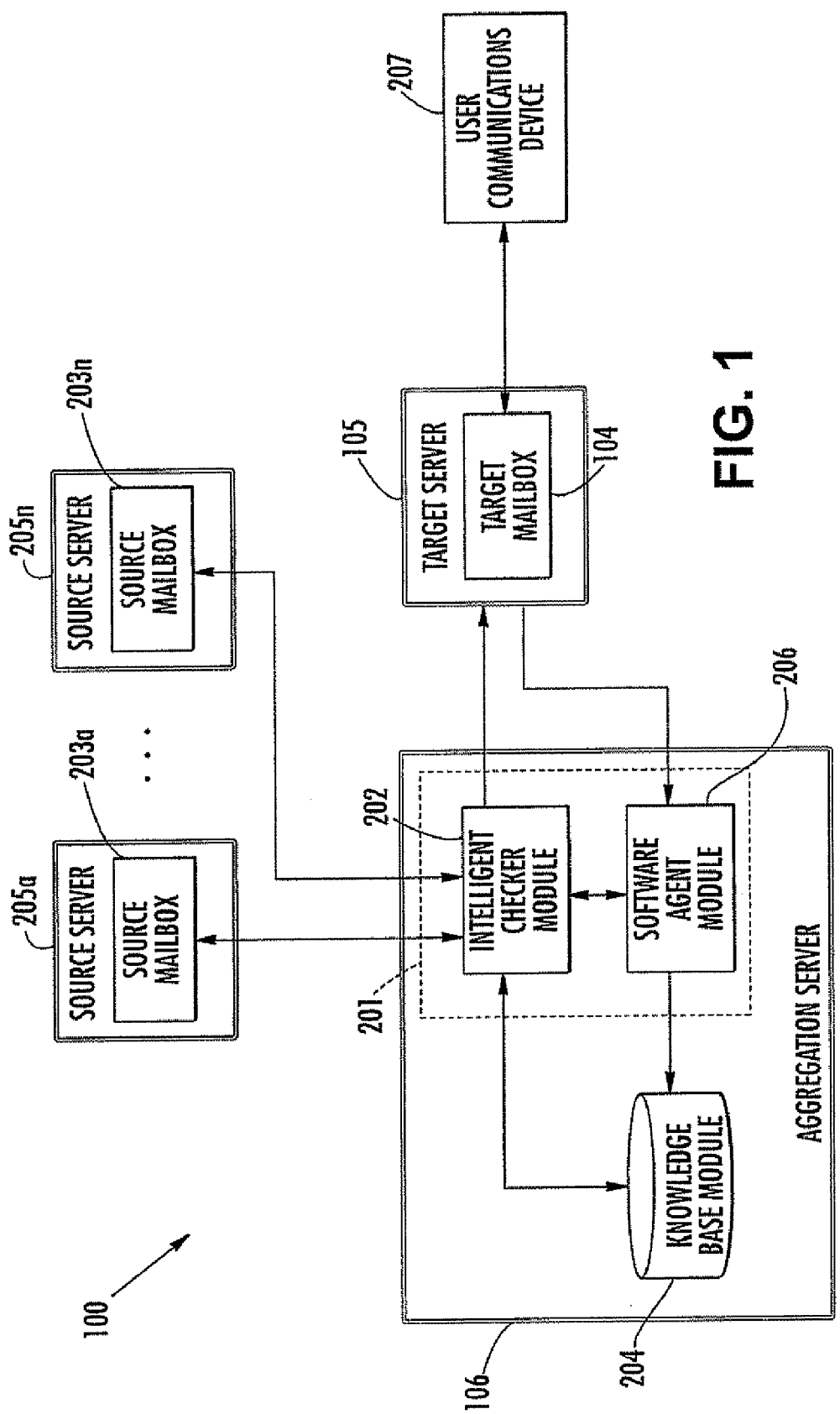
FIG. 1 is a schematic block diagram of a communications system in accordance with the present invention.

An aggregated e-mail delivery system 100 in accordance with the invention is first described with reference to FIGS. 1 and 2. The components of the aggregated e-mail delivery system 100 illustratively include a repsective source message box 203a-203n residing on each of a pluarity source servers 205a-205n, a target message box 104 residing on a target server 105, and an e-mail aggregation server 106. The aggregation server 106 communicates bi-directionally with the other servers, as will be readily appreciated by those skilled in the art.

The source message boxes 203a-203n (or sender's mailboxes) are "owned" by a particular user, and they hold messages for that user. The e-mail aggregation server 106 retrieves messages from each source message box 203a-203n. The target message box 104 is where the e-mail aggregation server 106 forwards or aggregates the messages to. The target mail server 105 generates message delivery failure or bounce messages if it is unable to deliver a message to the target message box 104, and the bounce message is sent to the e-mail aggregation server 106. This may happen when the target message box 104 is full, for example, among other reasons, as will be appreciated by those skilled in the art.

Figure 3:
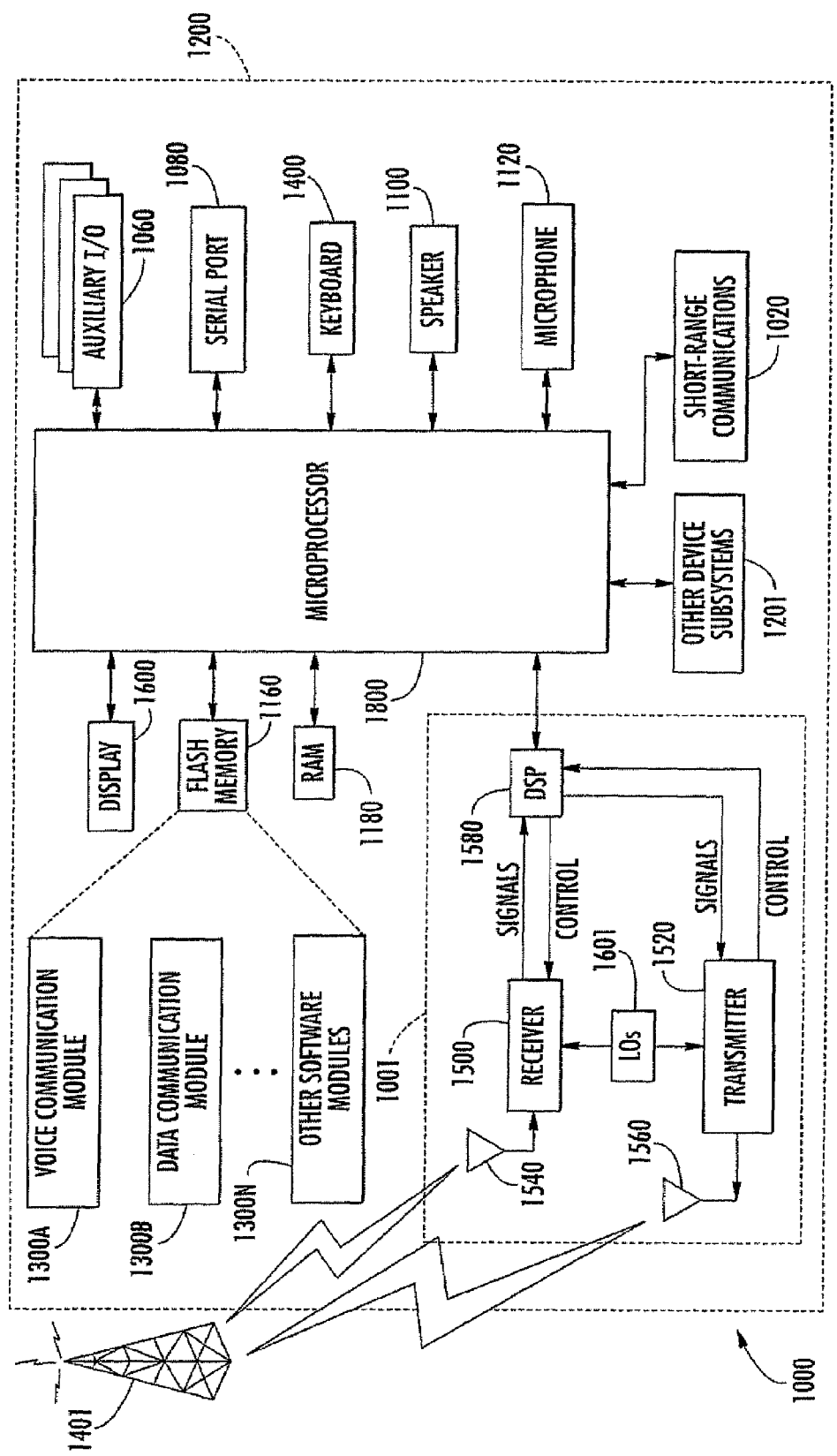
FIG. 3 is a schematic block diagram of an exemplary mobile wireless communications device for use with the present invention.

Stated alternately, the e-mail aggregation server 106 is the bridging component that connects the source message boxes 205a-205n with the target message box 104. The e-mail aggregation server 106 aggregates messages from source message boxes 203a-203n resident on the source servers 205a-205n to the target message box 104, and it includes various modules and agents to perform message throttling to resolve bounce messages, as will be described further below. The target message box 104 is accessed by a user's communications device 207, which may be a personal computer (PC), personal digital assistant (PDA), etc., as will be appreciated by those of skill in the art. FIG. 3 is a schematic block diagram of an exemplary mobile wireless communications device for use with the present invention.

More particularly, the e-mail aggregation server 106 includes an aggregation module 201 including an intelligent checker module 202 and a software agent module 206, and it also includes a knowledge base module 204. The knowledge base module 204 is a centralized database used to store pertinent information regarding the source message boxes 203a-203n and the target message box 104. The software agent module 206 provides a response mechanism that is triggered once a bounce message is received from the target server 105 at the e-mail aggregation server 106. Its task is to update the target message box record at the knowledge base module 204 based upon the new delivery failure state of the target message box 104.

The intelligent checker module 202 may conceptually be thought of as the "brain" of the e-mail aggregation server 106. More particularly, the e-mail aggregation server 106 performs a number of functions. As noted above, it checks for new messages in the source message boxes 203a-203n to send to the target message box 104. It also queries and updates message box information at the knowledge base module 204, throttles message delivery (as discussed further below), and cooperates with the software agent module 206 to process bounce messages from the target message box 104.

As noted above, the e-mail aggregation server 106 is responsible for transferring e-mail from the source message boxes 203a-203n to the target message box 104. In the illustrated embodiment, the e-mail aggregation server 106 accomplishes this by retrieving messages from the source message boxes 203a-203n, at which point certain transformations are made to the envelope and the headers thereof. However, the content or body of the e-mail messages is not modified. First, the envelope sender is changed to the unique e-mail address of the software agent module 206. Any delivery failure or bounce messages will therefore be returned to the software agent module 206. Second, additional information is added to each e-mail header section which uniquely identifies both the source message box 203 from which it came and the particular message stored therein that is being aggregated to the target message box 104.

When a message cannot be delivered to the target message box 104, a bounce message is generated and returned to the software agent module 206. By inspecting the bounce message, the software agent module 206 is able to discover the identity of the target message box 104 and notify the knowledge base module 204 that the target message box is currently unable to receive e-mails. It should be noted that the aggregation server 106 will send messages to numerous target message boxes for numerous users, although only a single target message box 104 is shown in the exemplary embodiment for clarity of illustration.

The intelligent checker module 202 periodically checks the knowledge base module 204 for message box updates and uses this updated information to throttle message delivery. The intelligent checker module 202 may throttle (i.e, slow down, speed up or even completely stop) the period of sending further e-mails to the target message box 104 until a later time. Since the software agent module 206 is able to determine the unique identifier of the e-mail message, it is also able to re-attempt delivery of that message to the target message box 104 at a later time.

Figure 2:
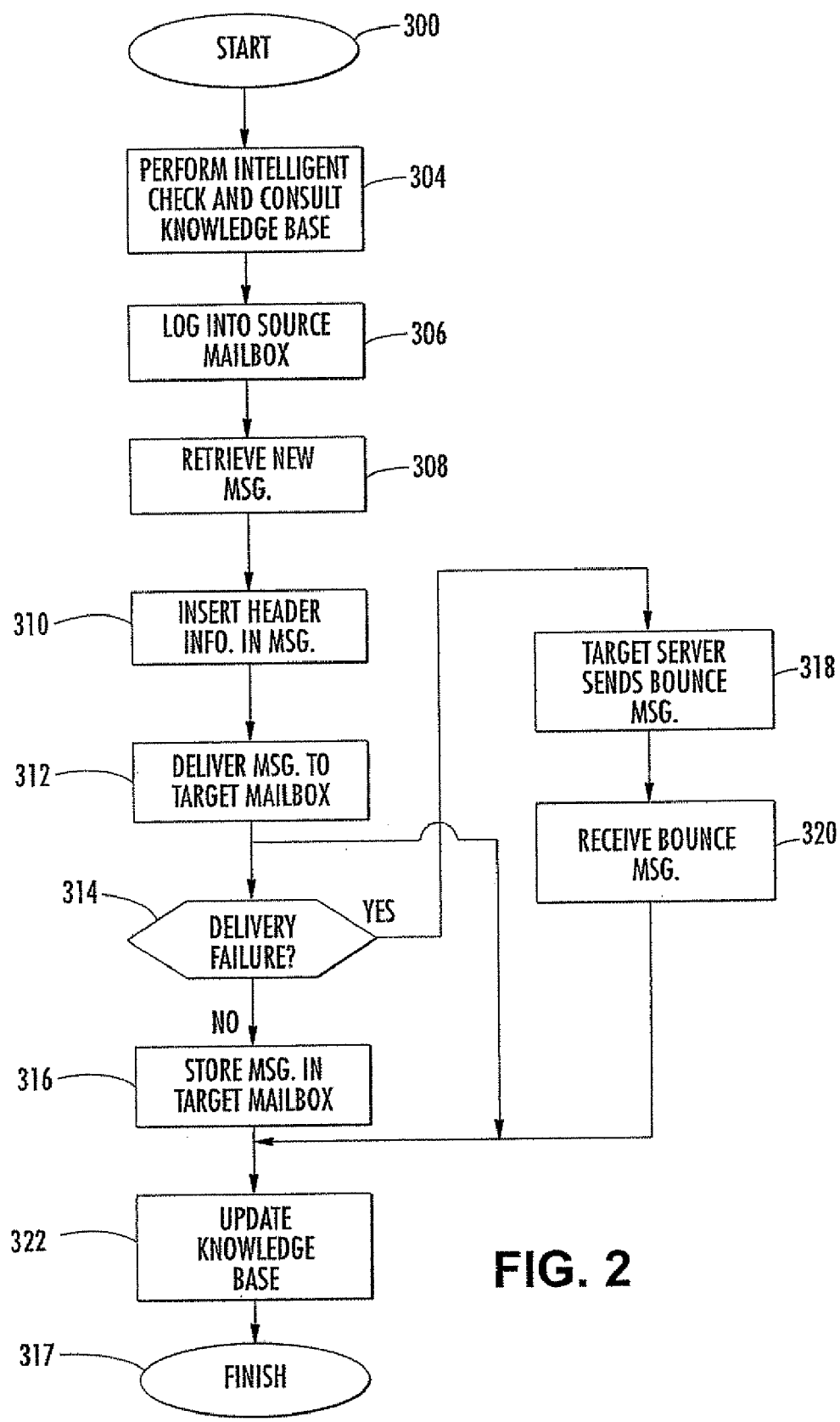
FIG. 2 is flow diagram illustrating a message aggregation method in accordance with the present invention.

Turning now additionally to FIG. 2, an e-mail aggregation server message throttling decision path in accordance with the present invention is now described. Unless otherwise noted, the steps described below pertain to those performed by the e-mail aggregation server 106. The process begins (Block 300) with the intelligent checker module 202 consulting the knowledge base module 204 to get source message box information therefrom, at Block 304. For example, the intelligent checker module 202 retrieves information such as the network addresses of the source message boxes 203a-203n, credentials to access the source message boxes, and a list of messages at the source message boxes that have already been seen. It may also take into account if the target message box 104 is known to not be accepting delivery.

The intelligent checker module 202 then logs into the source message boxes 203a-203n, at Block 306, downloads new messages (Block 308) therefrom, and temporarily stores the new messages in a memory thereof (not shown). The intelligent checker module 202 then inserts new header information in each message, at Block 310, and then delivers the message to the target message box 104, at Block 312.

If the delivery is a success (i.e., the message is successfully delivered to the target message box 104), at Block 314, the message is then stored in the target message box, at Block 316, and the knowledge base 204 is updated to include the unique mail identifiers, at Block 322, thus concluding the illustrated method (Block 317). However, if the delivery is a failure (i.e., the message cannot be delivered to the target message box 104), the target mail server 105 sends a delivery failure notification message or bounce message back to the aggregation e-mail server 106, at Block 318.

The software agent module 206 receives the bounce message (because of the unique identifier of the software agent module inserted in the message header), at Block 320, and it updates the knowledge base module 204 with the delivery failure information, at Block 322. More particularly, the software agent module 206 inspects the bounce message, determines which source message box 203, target message box 104, and specific e-mail message are involved in the delivery failure. This information is then saved in the knowledge base module 204 for future reference, thus concluding the illustrated method.

After the failure information is saved, the intelligent checker module 206 loops back to perform an intelligent check, and the system repeats itself. The intelligent checker module 206 may then use the intelligent check step (Block 304) to throttle message flow. That is, the intelligent checker module 206 may slow down (i.e., increase the period of sending), speed up (i.e., decrease the period of sending) or stop future attempts to send e-mail to the target message box 104, and can also support failed e-mail retries, as noted above.

It should be noted that in some embodiments the target message box 104 may reside on the aggregation server 106, such as if the target message box was hosted by an Internet service provider (ISP) that also provided the above-described aggregation features. Also, the various modules shown as residing on the aggregation server 106 may be implemented as software modules, and they could be spread across different servers or machines, as will be appreciated by those skilled in the art.

As also noted above, various prior art e-mail aggregation products are available. Two examples include Fetchmail and the eMail Bounce Handler program noted above. While Fetchmail does perform e-mail aggregation, it does not have a software agent or shared knowledge base, and it cannot implement throttling or a message retry/re-send when a target message box 104 is unavailable. As briefly noted above, eMail Bounce Handler is consumer-grade solution focused on removing malicious e-mail addresses from mailing lists. Yet, this product is not particularly well-suited for use in a high-scalability, multi-user server environment, nor does it provide throttling capabilities.

EXAMPLE

An exemplary hand-held mobile wireless communications device 1000 that can be used in the present invention is further described in the example below with reference to FIG. 3. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 3. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the That which is claimed is:

1. A communications system comprising:
a plurality of source message servers, each comprising a processor and a memory cooperating therewith for storing electronic mail (e-mail) messages;
target message server comprising a processor and a memory cooperating therewith to associate a target message box therewith; and
an aggregation server comprising a processor and a memory cooperating therewith for aggregating the e-mail messages from said source message servers to the target message server;
said processor and said memory of said aggregation server also for increasing a period of sending e-mail messages to the target message box based upon an e-mail delivery failure, and thereafter decreasing the period of sending e-mail messages to the target message box based upon at least one successful e-mail delivery;
said processor and said memory of said aggregation server also for selectively re-sending e-mail messages and for executing an intelligent checker module for aggregating the e-mail messages from said source servers to said target message box.

2. The communications system of claim 1 wherein said processor and said memory of said aggregation server also executes a software agent module having a unique address associated therewith; wherein said intelligent checker module sends the unique address with the e-mail messages to the target message box; wherein said target message server sends delivery failure messages to the unique address; and wherein said software agent module associates the delivery failure messages with the target message box.

3. The communications system of claim 2 wherein said processor and said memory of said aggregation server also execute a knowledge base module for cooperating with said software agent module for storing delivery failure information for the target message box; and wherein said intelligent checker module cooperates with said knowledge base module to increase or decrease the period of sending based upon the stored delivery failure information.

4. The communications system of claim 3 wherein said knowledge base module cooperates with said software agent module to store the delivery failure information for the target message box based upon a source message box identifier and a message identifier associated therewith.

5. The communications system of claim 1 further comprising a communications device associated with a user for accessing the messages from the target message box.

6. The communications system of claim 5 wherein said communications device comprises a mobile wireless communications device.

7. An electronic mail (e-mail) message aggregation server comprising:
a processor and a memory cooperating therewith to execute an aggregation module for aggregating e-mail messages stored on a plurality of source message servers to a target message box;
said aggregation module increasing a period of sending e-mail messages to the target message box based upon at least one e-mail delivery failure, and thereafter decreasing the period of sending e-mail messages to the target message box based upon at least one successful e-mail delivery;
said aggregation module selectively re-sending e-mail messages and executing an intelligent checker module for aggregating the e-mail messages from said source servers to said target message box.

8. The e-mail aggregation server of claim 7 wherein said aggregation module further comprises a software agent module having a unique address associated therewith for associating delivery failure messages with the target message box; and wherein said intelligent checker module sends the unique address with the e-mail messages to the target message box.

9. The e-mail aggregation server of claim 8 wherein said intelligent checker module cooperates with said software agent module to store the delivery failure information for the target message box based upon a source message box identifier and a message identifier associated therewith.

10. A method of operating an aggregation server comprising a processor for aggregating electronic mail (e-mail) messages comprising:
executing an aggregation module with the processor for periodically aggregating e-mail messages stored on a plurality of source message servers to a target message box;
the aggregation module increasing a period of sending messages to the target message box based at least one e-mail of delivery failure, and thereafter decreasing the period of sending messages to the target message box based upon at least one successful delivery e-mail; the aggregation module selectively re-sending e-mail messages; and
executing an intelligent checker module with the processor for aggregating the e-mail messages from the source servers to said target message box.

11. A physical computer-readable storage medium having computer-executable modules to be executed by an aggregation server, the computer-executable modules comprising:
an aggregation module for periodically aggregating electronic mail (e-mail) messages stored on a plurality of source message servers to a target message box; and
said aggregation module increasing a period of sending e-mail messages to the target message box based upon at least one e-mail delivery failure, and thereafter decreasing the period of sending e-mail messages to the target message box based upon a successful e-mail delivery;
said aggregation module selectively re-sending e-mail messages for which delivery failure messages are received;
an intelligent checker module for aggregating the e-mail messages from the source servers to the target message box.

12. The computer-readable medium of claim 11 wherein said aggregation module aggregation module further comprises a software agent module having a unique address associated therewith for associating delivery failure messages with the target message box; and wherein the intelligent checker module sends the unique address with the e-mail messages to the target message box.

13. The computer-readable medium of claim 12 wherein said knowledge base module cooperates with said software agent module to store the delivery failure information for the target message box based upon a source message box identifier and a message identifier associated therewith.

* * * * *

UNITED STATES PATENT AND TRADEMARK OFFICE
CERTIFICATE OF CORRECTION

PATENT NO.       : 7,689,656 B2                                              Page 1 of 1
APPLICATION NO.  : 11/459227
DATED            : March 30, 2010
INVENTOR(S)      : McCarthy et al.

It is certified that error appears in the above-identified patent and that said Letters Patent is hereby corrected as shown below:

Column 9, Line 12        Delete: "target"
                         Insert: --a target--

Signed and Sealed this

Seventeenth Day of August, 2010

David J. Kappos
*Director of the United States Patent and Trademark Office*